(No Model.)
J. GOLDMAN.
ASH SIEVE.
No. 517,139. Patented Mar. 27, 1894.
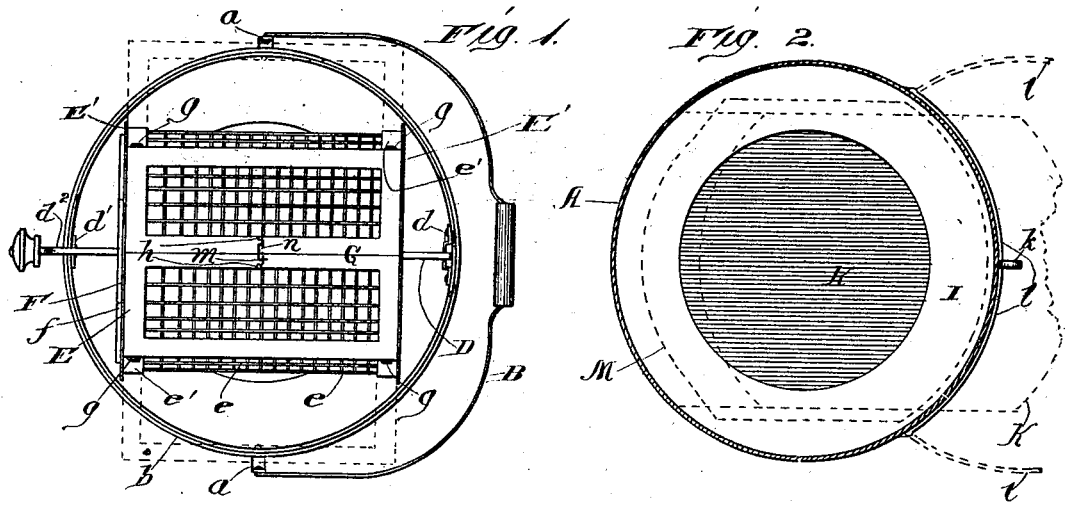
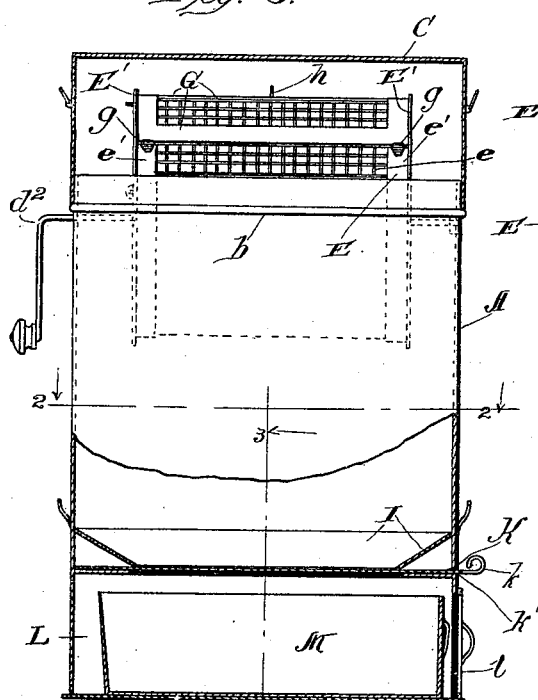
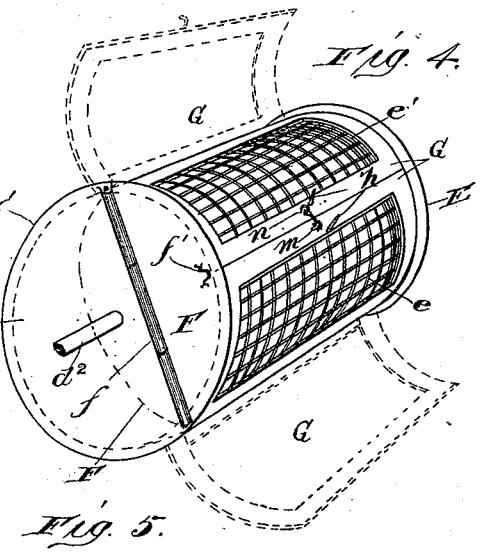
Witnesses:
Chas. E. Gorton
P. A. Duggan
Inventor:
Joseph Goldman
By Chas C. Tillman
Atty.
THE NATIONAL LITHOGRAPHING COMPANY,
WASHINGTON, D. C.

UNITED STATES PATENT OFFICE.

JOSEPH GOLDMAN, OF CHICAGO, ILLINOIS.

ASH-SIEVE.

SPECIFICATION forming part of Letters Patent No. 517,139, dated March 27, 1894.

Application filed March 7, 1893. Serial No. 465,045. (No model.)

*To all whom it may concern:*

Be it known that I, JOSEPH GOLDMAN, a citizen of the United States, residing at Chicago, in the county of Cook and State of Illinois, have invented certain new and useful Improvements in Ash-Sieves, of which the following is a specification.

This invention relates to improvements in sieves, and is more especially adapted to that class of such devices which are employed for separating ashes from the unconsumed pieces of coal; and it consists in certain peculiarities of the construction, novel arrangement, and operation of the various parts thereof, as will be hereinafter more fully set forth and specifically claimed.

The objects of my invention are first, to provide an ash-sieve or sifter, which shall be simple and inexpensive in construction, strong and durable, and effective in operation; and second, such a device in which the operation of sifting or separating the ashes from the particles of coal can be easily done, and without the escape of dust.

In order to enable others skilled in the art, to which my invention pertains to make and use the same, I will now proceed to describe it, referring to the accompanying drawings, in which—

Figure 1, is a plan view of my invention with the rotary sieve or sifter in position and with the cover of the vessel removed. Fig. 2, is a plan view, taken on line 2, 2, of Fig. 3. Fig. 3, is a side view partly in section of the device, showing the various parts thereof in position and ready for use. Fig. 4, is a perspective view of the rotary sieve or sifter removed from the vessel, and Fig. 5, is a vertical sectional view of the lower portion of the vessel, taken on line 3, 3, of Fig. 3, in the direction of the arrow.

Similar letters refer to like parts throughout the different views of the drawings.

A, represents the vessel, which may be made of any suitable size, form and material, but preferably cylindrical as shown in the drawings, and is provided on its periphery at suitable points with bearings $a$, for engagement with a bail B. The upper portion of the vessel A, is provided near its top with an annular rim or flange $b$, which strengthens the upper part thereof, and also acts as a stop or check to the cover C, which is made of suitable size and form to fit over the upper portion of the receiving vessel.

Just below the rim $b$, and diametrically opposite each other, are provided in the vessel A, bearings $d$, and $d'$, for the axle or shaft D, of the rotary sieve or sifter E, one end of which axle or shaft is formed or provided with a crank-handle $d^2$, for revolving the sieve. The bearing $d$ is preferably of cup shape, and secured to the inner face only of the vessel A; while the bearing $d'$ is preferably simply a notch in the upper edge of the vessel at a point opposite the bearing $d$.

As is shown in Fig. 4, the sieve or sifter E, is preferably formed cylindrical and of proper size to fit within the upper part of the vessel A, and to revolve therein on its axis, so that the ashes or other material contained therein may be thoroughly shaken and the finer particles allowed to fall into the vessel. In order to accomplish the aforesaid result, I construct the sieve of wire-netting $e$, or other perforated material, and secure it to the circular heads or disks E E', which are usually made of smooth material, and are provided near their peripheries with internal flanges $e'$, to receive and retain the netting or perforated material composing the body of the sieve. One of the disks E', is formed or provided with a door F of segment shape, which is suitably hinged as at $f$, on the chord of the circle to the remaining section of said disk, and is provided at its outer curved edge with a catch, or fastening $f'$ engaging the adjacent flange $e'$ to hold it in place, and permits of the emptying of the coal or screenings when opened to the position indicated by dotted lines in Fig. 4. By making this door F of segment shape opening at one side of the end of the sieve, it will be obvious that after the sifting has been done and the coal is to be discharged from the sieve, the door can be unfastened and the sieve inverted and inclined so as to cause the coal to run out of a mouth formed at the lower edge of the lowermost end of the sieve. This mouth is not impeded by the flange at all and even the door which normally hangs over the mouth rides upon the outflowing coal and checks the rising of dust.

In order to place the ashes to be sifted in the sieve, I form its body with two doors G, comprising frames carrying netting and which are suitably hinged as at $g$, and when opened to receive the ashes will assume the positions shown by dotted lines in Figs. 1, and 4, and will prevent the cylindrical sieve turning by reason of the lips or projections $h$, which are secured on the outer surface of said doors, and when the same are opened will engage with the upper edge of the vessel A, as is apparent.

The doors G, may be secured together, when closed, by means of a hook $m$, and eye $n$, or otherwise if desired.

The lower portion of the vessel A, may be provided with a funnel-shaped piece I, with its bottom open, to cause the ashes to be carried toward the center thereof. Just below the piece I, is placed a removable slide K, having a handle $k$, for operating the same, which slide moves in a suitable slot $k'$, in the vessel.

Below the slide K, the vessel A, may be provided with a door $l$, opening into the chamber L, in which is placed a pan or receptacle M, to receive the ashes in which they may be removed. Of course I may dispense with the receptacle M, and the door of the chamber, and leave the bottom of the same open so that the ashes may fall directly upon the ground. It is also obvious that the funnel-shaped piece I, and slide or floor K, may be omitted, but as the escapement of dust will be more effectually prevented thereby, I prefer to construct my device with them. It is further apparent that by having the bottom of the chamber L, open, the ashes may be discharged from the vessel A, by removing the slide or floor K, directly to the ground, when the vessel may be removed from over the same, thus avoiding the scattering of the ashes by the wind as occurs when carried out in an uncovered vessel.

Having thus fully described my invention, what I claim as new, and desire to secure by Letters Patent, is—

1. The herein described ash sieve, the same comprising a vessel open at its upper end and having bearings, a removable cover therefor, a cylindrical sifter composed of solid ends carrying shafts journaled in said bearings, internal flanges within said ends, a perforated body carried by said flanges, inlet doors in said body, and in one end an outlet door of segment shape hinged on the chord of a circle to the remaining section of the end and having a catch at its free curved edge engaging the flange, as and for the purpose set forth.

2. The herein described ash sieve, the same comprising an upright vessel having oppositely disposed bearings in its upper end, a cylindrical sifter journaled on a horizontal axis in said bearings, doors hinged in the sides of said sifter parallel with said axis, means for locking the doors when closed, and projections on the free edges of the doors adapted to engage over the upper edge of said vessel when the doors are thrown open for the admission of ashes, as and for the purpose set forth.

JOSEPH GOLDMAN.

Witnesses:
   CHAS. C. TILLMAN,
   E. A. DUGGAN.